(12) United States Patent
Yang et al.

(10) Patent No.: US 12,381,812 B2
(45) Date of Patent: Aug. 5, 2025

(54) SHORTEST PATH COMPUTATION METHOD, ROUTING OBTAINING DEVICE, AND SERVER

(71) Applicant: ZTE Corporation, Shenzhen (CN)

(72) Inventors: Jun Yang, Shenzhen (CN); Xin Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 661 days.

(21) Appl. No.: 17/638,055

(22) PCT Filed: Jul. 29, 2020

(86) PCT No.: PCT/CN2020/105535
§ 371 (c)(1),
(2) Date: Feb. 24, 2022

(87) PCT Pub. No.: WO2021/036660
PCT Pub. Date: Mar. 4, 2021

(65) Prior Publication Data
US 2022/0278920 A1 Sep. 1, 2022

(30) Foreign Application Priority Data
Aug. 30, 2019 (CN) .......................... 201910816009.2

(51) Int. Cl.
H04L 45/12 (2022.01)
H04L 45/02 (2022.01)
(52) U.S. Cl.
CPC .............. *H04L 45/12* (2013.01); *H04L 45/02* (2013.01)
(58) Field of Classification Search
CPC ......... H04L 45/12; H04L 45/02; H04L 45/14; H04L 45/124; Y02D 30/00; Y02D 30/70
See application file for complete search history.

(56) References Cited

U.S. PATENT DOCUMENTS

| 6,377,551 B1 | 4/2002 | Luo et al. |
| 6,717,920 B1 * | 4/2004 | Cheng ................... H04L 45/16 370/255 |

(Continued)

FOREIGN PATENT DOCUMENTS

| CN | 104753713 A | 7/2015 |
| CN | 105634954 A | 6/2016 |

(Continued)

OTHER PUBLICATIONS

European Patent Office. Extended European Search Report for EP Application No. 20857120.8, mailed Aug. 9, 2022, pp. 1-16.

(Continued)

*Primary Examiner* — Redentor Pasia
(74) *Attorney, Agent, or Firm* — Vivacqua Crane, PLLC (57) ABSTRACT

A method for calculating a shortest path, a routing acquisition device, a server and a non-transitory computer-readable storage medium are disclosed. The method may include: acquiring resource information for a network according to a received routing request, where the routing request includes a start node, an end node, a service constraint, and an obligatory constraint; calculating service constraint weights for topological elements in the network according to the service constraint, and calculating obligatory constraint weights for the topological elements according to the obligatory constraint and the resource information for the network; and calculating, according to the service constraint weights and the obligatory constraint weights for the topological elements, a shortest path from the start node to the end node that satisfies the obligatory constraint.

14 Claims, 6 Drawing Sheets

(56) References Cited

U.S. PATENT DOCUMENTS

| | | | |
|---|---|---|---|
| 2004/0042406 A1* | 3/2004 | Wu | H04L 45/22 370/238 |
| 2005/0129005 A1* | 6/2005 | Srikrishna | H04L 45/20 370/356 |
| 2005/0265258 A1* | 12/2005 | Kodialam | H04L 45/04 370/254 |
| 2007/0280117 A1 | 12/2007 | Katz et al. | |
| 2010/0034098 A1 | 2/2010 | Wang et al. | |
| 2012/0127875 A1* | 5/2012 | Zhao | H04L 12/4625 370/252 |
| 2013/0236176 A1* | 9/2013 | Doverspike | H04Q 11/0062 398/57 |
| 2014/0153403 A1* | 6/2014 | Allan | H04L 45/38 370/238 |
| 2015/0319078 A1* | 11/2015 | Lee | H04L 45/12 370/392 |
| 2017/0187609 A1 | 6/2017 | Lee et al. | |
| 2018/0109439 A1* | 4/2018 | Chen | H04L 45/124 |
| 2019/0356595 A1* | 11/2019 | Avidar | H04L 47/125 |
| 2020/0236034 A1* | 7/2020 | Smith | H04L 47/125 |
| 2020/0374228 A1* | 11/2020 | Yang | H04L 45/123 |

FOREIGN PATENT DOCUMENTS

| | | |
|---|---|---|
| CN | 107733796 A | 2/2018 |
| CN | 108075980 A | 5/2018 |
| CN | 108683593 A | 10/2018 |
| CN | 109995650 A | 7/2019 |

OTHER PUBLICATIONS

The State Intellectual Property Office of People's Republic of China. First Office Action for CN Application No. 2019108160092 and English translation, mailed Sep. 27, 2022, pp. 1-7.

The State Intellectual Property Office of People's Republic of China. First Search Report for CN Application No. 2019108160092 and English translation, mailed Sep. 20, 2022, pp. 1-5.

International Searching Authority. International Search Report and Written Opinion for PCT Application No. PCT/CN2020/105535 and English translation, mailed Oct. 27, 2020, pp. 1-10.

Feng, et al. "Geometric Algebra-Based Algorithm for Solving Nodes Constrained Shortest Path," ACTA Electronica Sinica, vol. 42, No. 5, issued May 2014, pp. 846-851.

* cited by examiner

SHORTEST PATH COMPUTATION METHOD, ROUTING OBTAINING DEVICE, AND SERVER

CROSS-REFERENCE TO RELATED APPLICATION

This application is a national stage filing under 35 U.S.C. § 371 of international application number PCT/CN2020/105535, filed Jul. 29, 2020, which claims priority to Chinese patent application No. 201910816009.2 filed on Aug. 30, 2019. The contents of these applications are incorporated herein by reference in their entirety.

TECHNICAL FIELD

The embodiments of the present disclosure relate to the field of communication technology, and in particular to a method for calculating a shortest path, a routing acquisition device, and a server.

BACKGROUND

Software defined network (SDN) is a new type of network architecture, the main idea of which is to separate the control plane and data plane of network apparatuses and realize centralized control of the network by introducing controllers, so as to realize more open and flexible network management as well as more intelligent and convenient resource scheduling and operation maintenance. The SDN controller may use the link layer discovery protocol to acquire network resource information. The network resource information includes real-time bandwidth and delay of network-wide topology and links. Based on such information, the SDN controller can easily calculate the shortest (i.e., optimal) path to meet the service requirements.

As the communication services become more and more diverse, there are more and more constraints on network routing. In addition to the requirements (such as bandwidth, delay, delay jitter, etc.) regarding the quality of service, some obligatory nodes or links may be designated for routing. For example, due to requirements of information security, it is required that certain flows must pass through specific routing and switching devices or links. In addition, some cross-border communications may be required to bypass some politically sensitive areas or must pass through networks in specific regions or network nodes. This requires the controller to add obligatory constraints (including obligatory nodes and obligatory links) to the routing calculation process.

The K shortest path algorithm is one of the classical methods to calculate shortest paths with obligatory constraints, the principle of which is to use the shortest path algorithm to calculate the first K shortest paths in sequence in a given network topology, and after each path is calculated, to check whether it satisfies the obligatory constraints (i.e., whether the path passes through all required obligatory nodes and obligatory links); and if the k-th shortest path satisfies the obligatory constraints, then stop the calculation and return that path as the calculation result, otherwise continue to calculate the (k+1)th shortest path until a path satisfying the obligatory constraints is found or all paths have been traversed, then stop the calculation.

SUMMARY

The embodiments of the present disclosure provide a method for calculating a shortest path, a routing acquisition device, and a server.

The embodiments of the present disclosure provide a method for calculating a shortest path, which may include: acquiring resource information for a network according to a received routing request, where the routing request includes a start node, an end node, a service constraint, and an obligatory constraint; calculating service constraint weights for topological elements in the network according to the service constraint, and calculating obligatory constraint weights for the topological elements according to the obligatory constraint and the resource information for the network; calculating, according to the service constraint weights and the obligatory constraint weights for the topological elements, a shortest path from the start node to the end node that satisfies the obligatory constraint.

The embodiments of the present disclosure further provide a routing acquisition device, which may include: a topology acquisition module configured to acquire resource information for a network according to a received routing request, where the routing request includes a start node, an end node, a service constraint, and an obligatory constraint; a weight calculation module configured to calculate service constraint weights for topological elements in the network according to the service constraint, and calculate obligatory constraint weights for the topological elements according to the obligatory constraint and the resource information for the network; and a routing calculation module configured to calculate, according to the service constraint weights and the obligatory constraint weights for the topological elements, a shortest path from the start node to the end node that satisfies the obligatory constraint.

The embodiments of the present disclosure further provide a server, which may include: at least one processor; and a memory connected to the at least one processor, where the memory stores instructions executable by the at least one processor, the instructions being executed by the at least one processor to enable the at least one processor to perform the above method for calculating a shortest path.

The embodiments of the present disclosure further provide a non-transitory computer-readable storage medium storing a computer program which, when executed by a processor, causes the processor to perform the above method for calculating a shortest path.

BRIEF DESCRIPTION OF DRAWINGS

One or more embodiments are illustrated with reference to corresponding figures in the accompanying drawings, and these illustrations do not constitute a limitation to the embodiments. Elements having the same reference signs in the accompanying drawings represent similar elements. The figures in the accompanying drawings are not necessarily drawn to scale unless otherwise specified.

DETAILED DESCRIPTION

In order to make the purposes, technical schemes and advantages of the embodiments of the present disclosure clear, the embodiments of the present disclosure will be described in detail with reference to the accompanying drawings. Those having ordinary skills in the art can understand that, in various embodiments of the present disclosure, many technical details have been set forth in order to enable readers to better understand the present disclosure. However, even without these technical details and various changes and modifications based on the following embodiments, the technical schemes of the present disclosure can be implemented. The following embodiments are divided for convenience of description, and should not constitute any limitation on the specific implementation of the present disclosure. The embodiments can be combined with and referenced by each other with no conflict.

Although the current K shortest path algorithm can theoretically guarantee to obtain the shortest path that satisfies the obligatory constraint, the algorithm is not designed for obligatory constraints and its computational complexity is $O(Kn^3)$, where n is the number of nodes in the network topology and K is the number of shortest paths that have been found. Therefore, when the scale of the network is large, i.e., when the number of nodes in the network topology is large, the computational efficiency of this algorithm will be very low and it is difficult to meet the real-time requirements of routing calculation. Moreover, for routing calculations with obligatory constraints, the solution process of the K shortest path algorithm contains too many invalid calculations. Based on the above findings, the inventors propose the technical scheme of the present disclosure. That is, the method for calculating a shortest path of this embodiment is proposed for routing calculation of the shortest path with obligatory constraints in a network.

Figure 1:
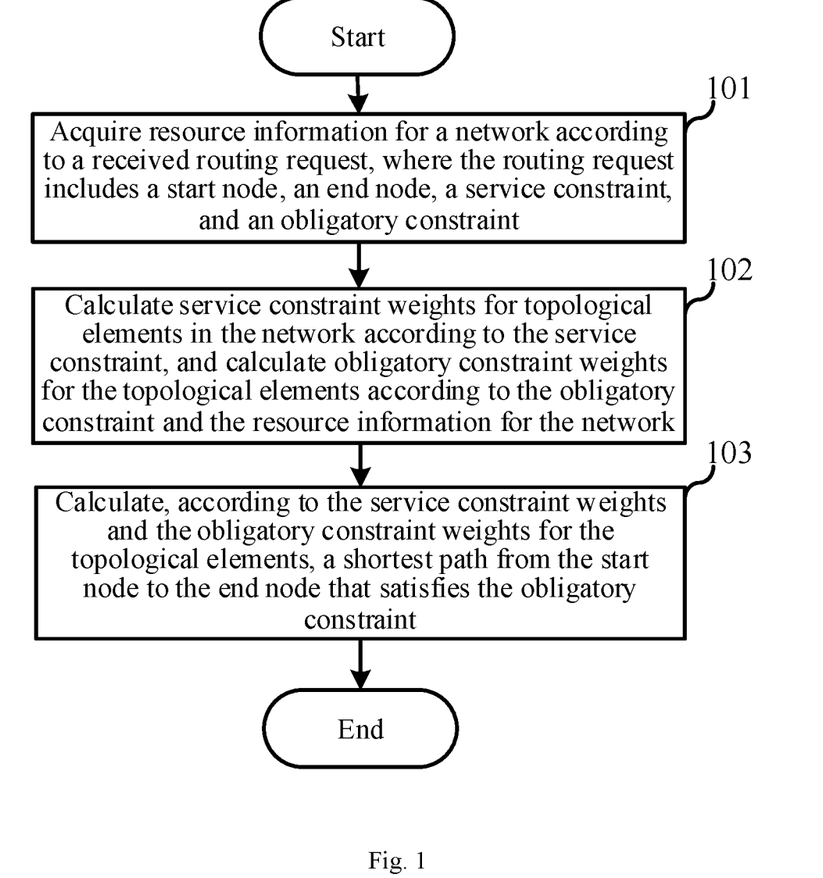
FIG. 1 is a flowchart of a method for calculating a shortest path according to an example embodiment one of the present disclosure.

The example embodiment one of the present disclosure relates to a method for calculating a shortest path. The process is as shown in FIG. 1.

In step 101, resource information for a network is acquired according to a received routing request, where the routing request includes a start node, an end node, a service constraint, and an obligatory constraint.

In step 102, service constraint weights for topological elements in the network are calculated according to the service constraint, and obligatory constraint weights for the topological elements are calculated according to the obligatory constraint and the resource information for the network.

In step 103, a shortest path from the start node to the end node that satisfies the obligatory constraint is calculated according to the service constraint weights and the obligatory constraint weights for the topological elements.

The implementation details of the method for calculating a shortest path of this implementation are specified below, and the following are implementation details provided for ease of understanding only, and are not necessary to implement this scheme.

The network in this embodiment may be a software-defined network, referred to as an SDN; and the method for calculating a shortest path in this embodiment is applied to a routing acquisition device, which may exist independently or may be integrated in an SDN controller.

In step 101, the routing request received by the routing acquisition device includes a start node, an end node, a service constraint, and an obligatory constraint. Here, the service constraint refers to the quality of the service, i.e., the requirement for transmission quality, and the quality of the service includes, for example, forwarding hop count, required bandwidth, delay, delay jitter, etc.; and the obligatory constraint refers to the nodes and/or links that must be passed through from the start node to the end node, where the nodes or links that must be passed through may be collectively referred to as obligatory elements.

The routing acquisition device may acquire the resource information for the network according to the service constraint in the routing request. The network refers to a network where the start node and the end node are located, and the resource information for the network includes information such as the topological structure of the network, the real-time bandwidth of each topological element, and the delay, where the routing acquisition device acquires from the network an available topology that satisfies the service constraint. Here, the topological element is a node or link in that available topology.

Figure 2:
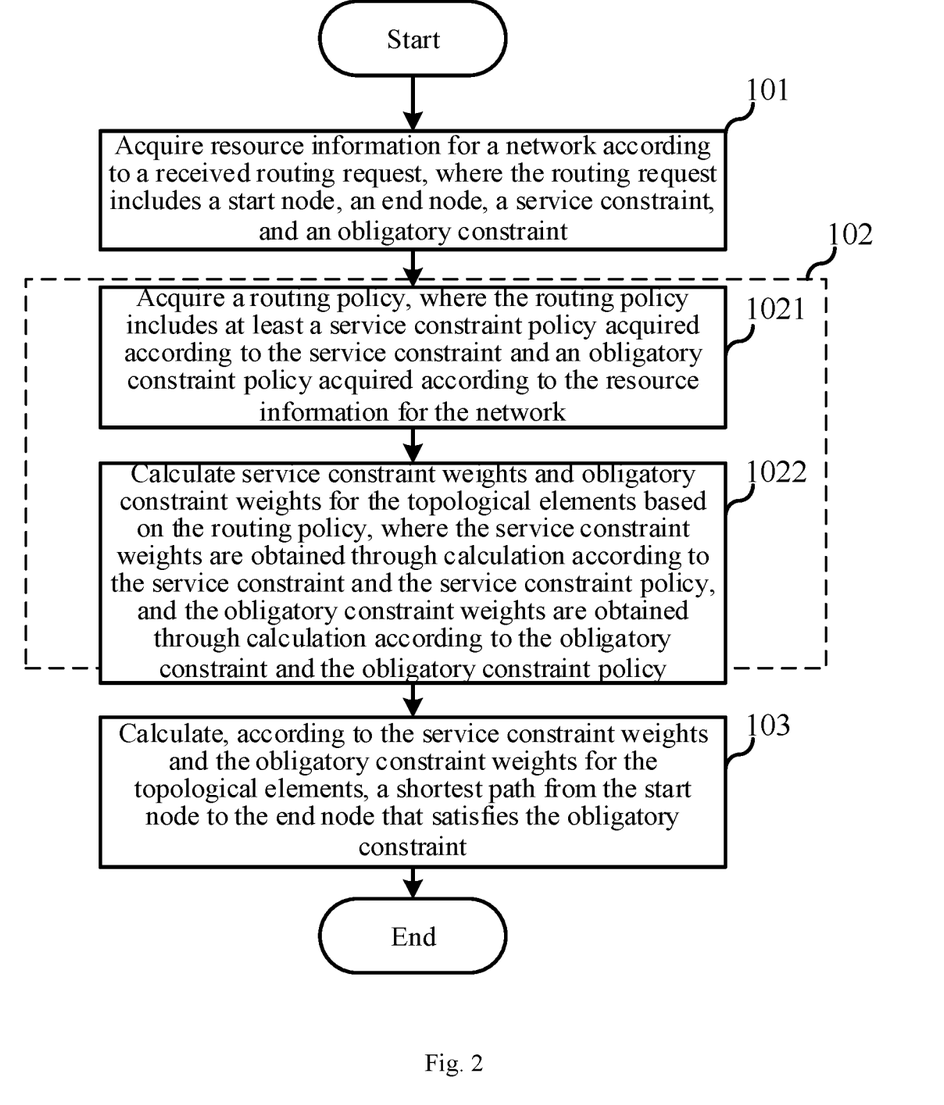
FIG. 2 is a flowchart of an example of step 102 according to the example embodiment one of the present disclosure.

As shown in the example of FIG. 2, step 102 includes two sub-steps.

In sub-step 1021, a routing policy is acquired, where the routing policy includes at least a service constraint policy acquired according to the service constraint and an obligatory constraint policy acquired according to the resource information for the network.

In sub-step 1022, service constraint weights and obligatory constraint weights are calculated for the topological elements based on the routing policy, where the service constraint weights are obtained through calculation according to the service constraint and the service constraint policy, and the obligatory constraint weights are obtained through calculation according to the obligatory constraint and the obligatory constraint policy.

In sub-step 1021, specifically, a first selection policy is pre-stored in the routing acquisition device, and the first selection policy is used to select a corresponding service constraint policy for the service constraint in the routing request. That is, the first selection policy may be understood as a selection function, where a service constraint is taken as an input parameter of the first selection policy, and the first selection policy determines a service constraint policy corresponding to that service constraint by analyzing the service constraint. For example, if the service constraint contains a limit on the forwarding hop count, the service constraint policy corresponding to the service constraint that is determined by this first selection policy may be a minimum-hop policy.

Different service constraints correspond to different service constraint policies. Different service constraint policies include, for example, a minimum-hop policy, a bandwidth balancing policy, a minimum-delay policy, a minimum-delay jitter policy, and the like. More specifically, for example: when the service constraint policy is the minimum-hop policy, the service constraint weights of all links may be set to a constant greater than 0, e.g., 100; when the service constraint policy is the bandwidth balancing policy, the service constraint weight is determined by the ratio of the bandwidth required by the service to the bandwidth available at that node or link; when the service constraint policy is the minimum-delay policy, the service constraint weight is determined by the delay of the node or link; and when the service constraint policy is the minimum-delay jitter policy, the service constraint weight is determined by the delay jitter of the node or link.

Similarly, a second selection policy is pre-stored in the routing acquisition device, and the second selection policy is used to select a corresponding obligatory constraint policy for this current network. That is, the second selection policy may be understood as a selection function, where the resource information for the network is taken as an input parameter of the second selection policy, and the second selection policy determines an obligatory constraint policy by analyzing the resource information for the network. The resource information for the network may include, for example, the forwarding hop count, required bandwidth, delay, delay jitter, etc., of each topological element, the distance between the topological elements, and the like.

In sub-step 1022, the service constraint weights and obligatory constraint weights may be calculated. For ease of description, the following notations are introduced: network $G=G(V, E)$, where V is the set of nodes in G and E is the set of links in G; the service constraints for the routing request include the forwarding hop count h, the required bandwidth b, the delay d, and the delay jitter j, etc.; and the obligatory elements (obligatory nodes or obligatory links) in the $e \in S_E$, where $S_E$ is the set of obligatory elements and $S_E \in G$. Let the topological elements (nodes or links) to be examined be $g \in G$.

In an example, the service constraint weight $w_I$ for g may be expressed as:

$$w_I = f(h, b, d, j, \ldots) \qquad \text{Equation (1)}$$

where the function f is the service constraint policy here, and after substituting the forwarding hop count h, required bandwidth b, delay d, and delay jitter j of each topological element into this function f for calculation, the service constraint weight $w_I$ of each topological element may be obtained.

In an example, an obligatory constraint weight for each topological element g includes a total sum of obligatory constraint weights generated by obligatory elements e in the obligatory constraint on the topological element g; and an obligatory constraint weight generated by each obligatory element e on the topological element is obtained based on the obligatory constraint policy.

The obligatory constraint weight $w_C(g)$ for each topological element g may be expressed as:

$$W_C(g) = \sum_{e \in S_E} f_C^E(e, g, G) \qquad \text{Equation (2)}$$

where function $f_C^E$ is the obligatory constraint policy here.

In an example, the obligatory constraint policy is expressed as the following equation:

$$f_C^E(e, g, G) = c_e w_0 v_g^e(G) / v_B^e(G) \qquad \text{Equation (3)}$$

The parameters in Equation (3) are explained below.

$w_0$ denotes the statistical characteristic value of the service constraint weights of at least part of the topological elements. In an example, the at least part of the topological elements may include: a topological element in the set of the topological elements directly connected to the obligatory elements. That is, $w_0$ may be the statistical characteristic value of the service constraint weight of a topological element directly connected to the obligatory elements. However, without limitation, $w_0$ may also be the statistical characteristic value of the service constraint weights of all topological elements. Here, the statistical characteristic value may be one of a minimum value, a maximum value, an average value, and a median value of the service constraint weights for the topological elements.

$c_e$ denotes a ratio evaluation coefficient of the service constraint weight and the obligatory constraint weight of an obligatory element, and $c_e$ is a real number greater than 0. Here, the ratio evaluation coefficient may be set according to the actual situation.

$v_g^e(G)$ denotes a proximity evaluation coefficient for an obligatory element with respect to a topological element. In an example, it may be measured by the distance between an obligatory element and a topological element, and the larger the distance, the larger the proximity evaluation coefficient.

$v_B^e(G)$ denotes a baseline value of a proximity evaluation coefficient for an obligatory element with respect to at least part of the topological elements. In an example, the at least part of the topological elements may include: a topological element in the set of the topological elements directly connected to the obligatory elements. That is, $v_B^e(G)$ may be the baseline value of the proximity evaluation coefficient for an obligatory element with respect to topological elements directly connected to the obligatory element. However, without limitation, $v_B^e(G)$ may also be the baseline value of the proximity evaluation coefficient for an obligatory element with respect to each topological element in the network.

Here, the function $f_C^E$ denotes the obligatory constraint policy, and after substituting the relevant information for each obligatory element e into the above function $f_C^E$, the obligatory constraint weight $f_C^E(e, g, G)$ generated by each obligatory element on the topological element may be calculated. The relevant information for the obligatory element e includes, for example, the service constraint weight for the obligatory element e, the distance between the obligatory element e and the topological element, and other information that may be used to calculate the values of the parameters in Equation (3) above.

If the obligatory constraint contains both obligatory nodes and obligatory links, let the obligatory nodes $n \in S_N$, the set of obligatory nodes $S_N \in V$; and the obligatory links $\ell \in S_L$, the set of obligatory links $S_L \in E$, where $S_E = S_N \cup S_L$, then, corresponding to the above Equations (2) and (3), the obligatory constraint weights $w_C(g)$ for g may be expressed as follows:

$$W_C(g) = \sum_{n \in S_N} f_C^N(n, g, G) + \sum_{\ell \in S_L} f_C^L(\ell, g, G)$$

$$f_C^N(n, g, G) = c_n w_0 v_g^n(G) / V_B^n(G)$$

$$f_C^L(\ell, g, G) = c_\ell w_0 v_g^\ell(G) / V_B^\ell(G)$$

where $c_n$ and $c_l$ are the ratio evaluation coefficients for the service constraint weights with respect to the obligatory constraint weights for the obligatory nodes and obligatory links, respectively; $v_g^n(G)$ and $v_g^l(G)$ denote the proximity evaluation coefficients for the obligatory nodes and obligatory links with respect to the topological elements, respectively; and $v_B^n(G)$ and $v_B^l(G)$ denote the baseline values of the proximity evaluation coefficients for the obligatory nodes and obligatory links with respect to the topological elements, respectively.

Figure 3:
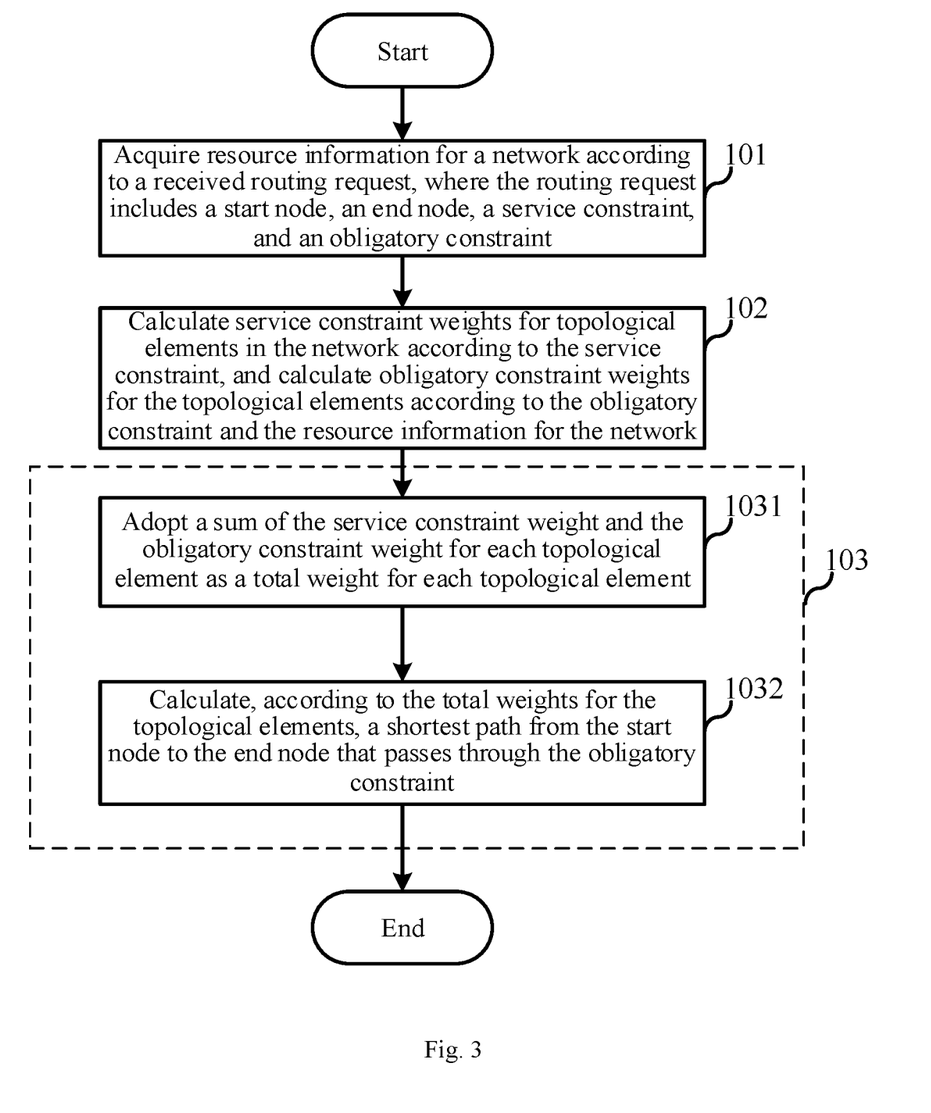
FIG. 3 is a flowchart of an example of step 103 according to the example embodiment one of the present disclosure.

In an example, as shown in FIG. 3, step 103 contains the following sub-steps.

In sub-step 1031, a sum of the service constraint weight and the obligatory constraint weight for each topological element is used as a total weight for each topological element.

In sub-step 1032, a shortest path from the start node to the end node that passes through the obligatory constraint is calculated according to the total weights for the topological elements.

In sub-step 1031, the total weight for each topological element is equal to the sum of the service constraint weight and the obligatory constraint weight. However, without limitation, in other examples, it is also possible to set different weight coefficients for the service constraint weights and the obligatory constraint weights as needed, that is, the total weight of a topological element=the product of the service constraint weight and its corresponding weight coefficient+the product of the obligatory constraint weight and its corresponding weight coefficient.

In sub-step 1032, this may be implemented based on the K shortest path algorithm; and the routing policy determined in sub-step 1021 may further include a K value determined based on the resource information for the network, e.g., a K value determined based on the topological size of the network, sparsity, etc., where the K value is an upper limit on the number of shortest paths traversed.

Figure 4:
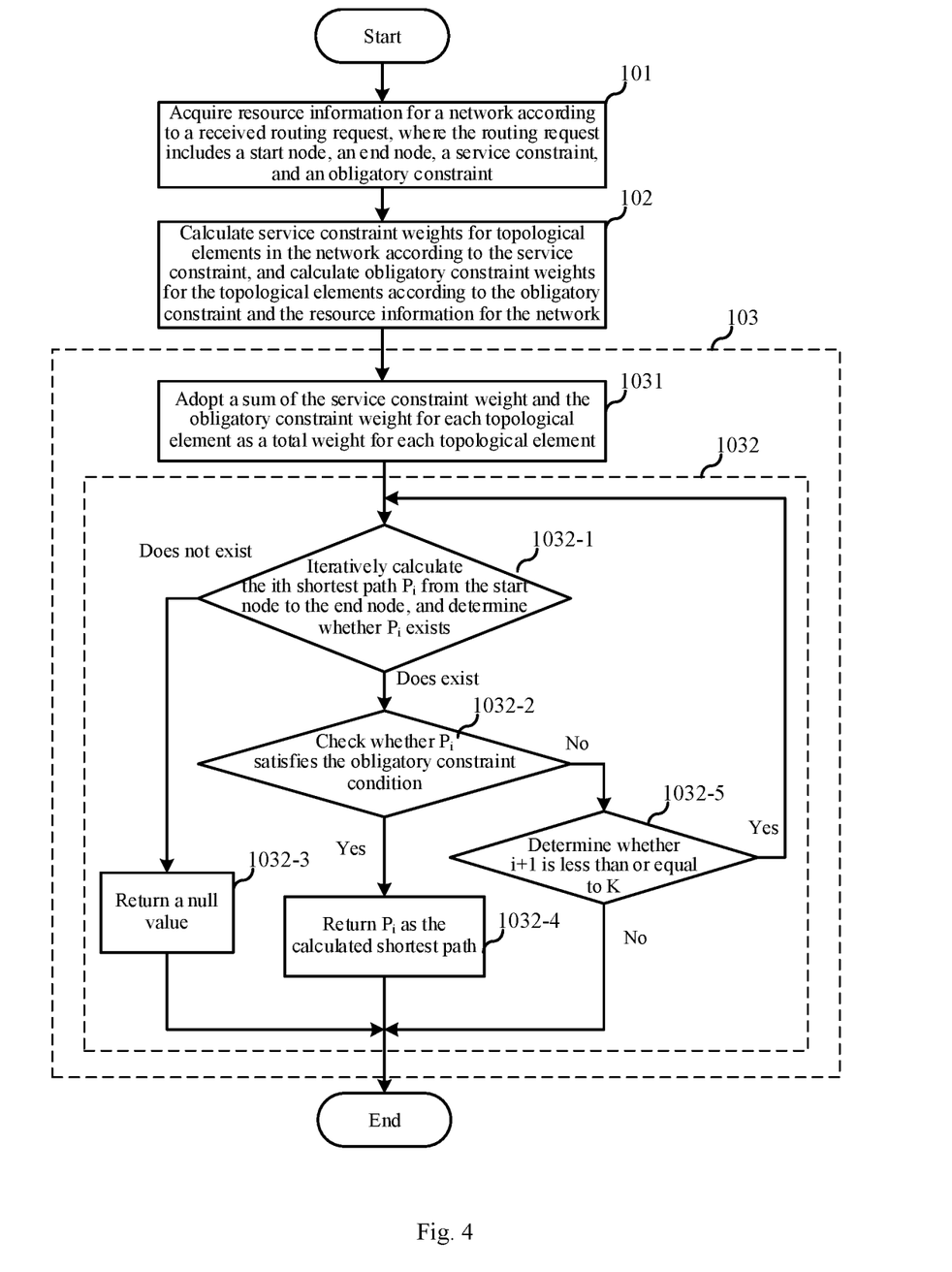
FIG. 4 is a flowchart of an example of sub-step 1032 according to the example embodiment one of the present disclosure.

Specifically, the Dijkstra algorithm may be used to calculate the shortest path $P_0$, where the length of the path is measured in terms of path cost. The path cost represents the degree to which the path satisfies the routing requirements, and the path cost is the sum of the weights of all nodes and links on the path, and the larger the path cost, the lower the degree of satisfaction. The basic idea of the K shortest path algorithm is as follows: the suboptimal paths (i.e., the second shortest path, the third shortest path, . . . ) are calculated one by one using an iterative method based on the shortest path $P_0$; every time a suboptimal path $P_i$ is obtained, it is first checked whether $P_i$ satisfies the obligatory constraint condition, if so, $P_i$ is returned as the calculation result, and if not, the relationship between i+1 and K is determined, if i+1≤K, the process continues to calculate the $P_{i+1}$th suboptimal path, and if the $P_{i+1}$th suboptimal path is not found, it means that there are only i reachable paths from the start node to the end node in the current network topology, then a null value is returned and the calculation is ended; and if i+1>K, it means that a path satisfying the obligatory constraint cannot be found under the current routing policy. Referring to FIG. 4, sub-step 1032 includes the following sub-steps:

In sub-step 1032-1, the i-th shortest path $P_i$ from the start node to the end node is iteratively calculated, if $P_i$ exists, the process proceeds to sub-step 1032-2; and if not, the process proceeds to sub-step 1032-3.

In sub-step 1032-2, it is checked whether $P_i$ satisfies the obligatory constraint condition, if yes, the process proceeds to sub-step 1032-4; and if not, the process proceeds to sub-step 1032-5.

In sub-step 1032-3, a null value is returned and the process ends.

In sub-step 1032-4, $P_i$ is returned as the calculated shortest path and the process ends.

In sub-step 1032-5, it is determined whether i+1 is less than or equal to K, if yes, the process returns to sub-step 1032-1; and if not, the process ends.

It should be noted that this embodiment is implemented based on the K shortest path algorithm. However, without limitation, any method that can use the total weight for each topological element to find the shortest path from the start node to the end node is applicable to this embodiment.

Compared with the existing technology, in the embodiments of the present disclosure, an obligatory constraint policy is acquired according to resource information for the network, and obligatory constraint weights of topological elements are calculated according to the obligatory constraint and the obligatory constraint policy; and a shortest path from the start node to the end node that satisfies the obligatory constraint is calculated according to the service constraint weights and the obligatory constraint weights for the topological elements. That is, in the calculation of the shortest path, in addition to the service constraint weight as a consideration factor, the obligatory constraint weight is also introduced, and the obligatory constraint weight is taken into consideration together with the service constraint weight to realize the routing calculation with obligatory constraints, and thus the efficiency of the routing calculation with obligatory constraints in large-scale complex networks can be significantly improved.

In some embodiments, the parameters in the obligatory constraint policy are calculated using the topological elements directly connected to the obligatory elements, which makes the resulting obligatory constraint policy more accurate.

In some embodiments, in the calculation of the shortest path, the weights of both links and nodes in the network are considered at the same time, which is more comprehensive compared to the existing technology where only the weights of links are considered.

In some embodiments, using the sum of the service constraint weight and the obligatory constraint weight as the total weight for each topological element provides a combination of considering the service constraint weights and the obligatory constraint weights together.

An example embodiment two of the present disclosure relates to a method for calculating a shortest path. The example embodiment two is substantially the same as the example embodiment one, with the main difference being that: in the example embodiment two of the present disclosure, if the shortest path cannot be obtained according to the service constraint weights and the obligatory constraint weights for the topological elements, the routing policy is adjusted and the service constraint weights and the obligatory constraint weights for the topological elements are recalculated based on the adjusted routing policy, and then the shortest path from the start node to the end node that satisfies the obligatory constraint is calculated according to the recalculated service constraint weights and obligatory constraint weights for the topological elements.

Figure 5:
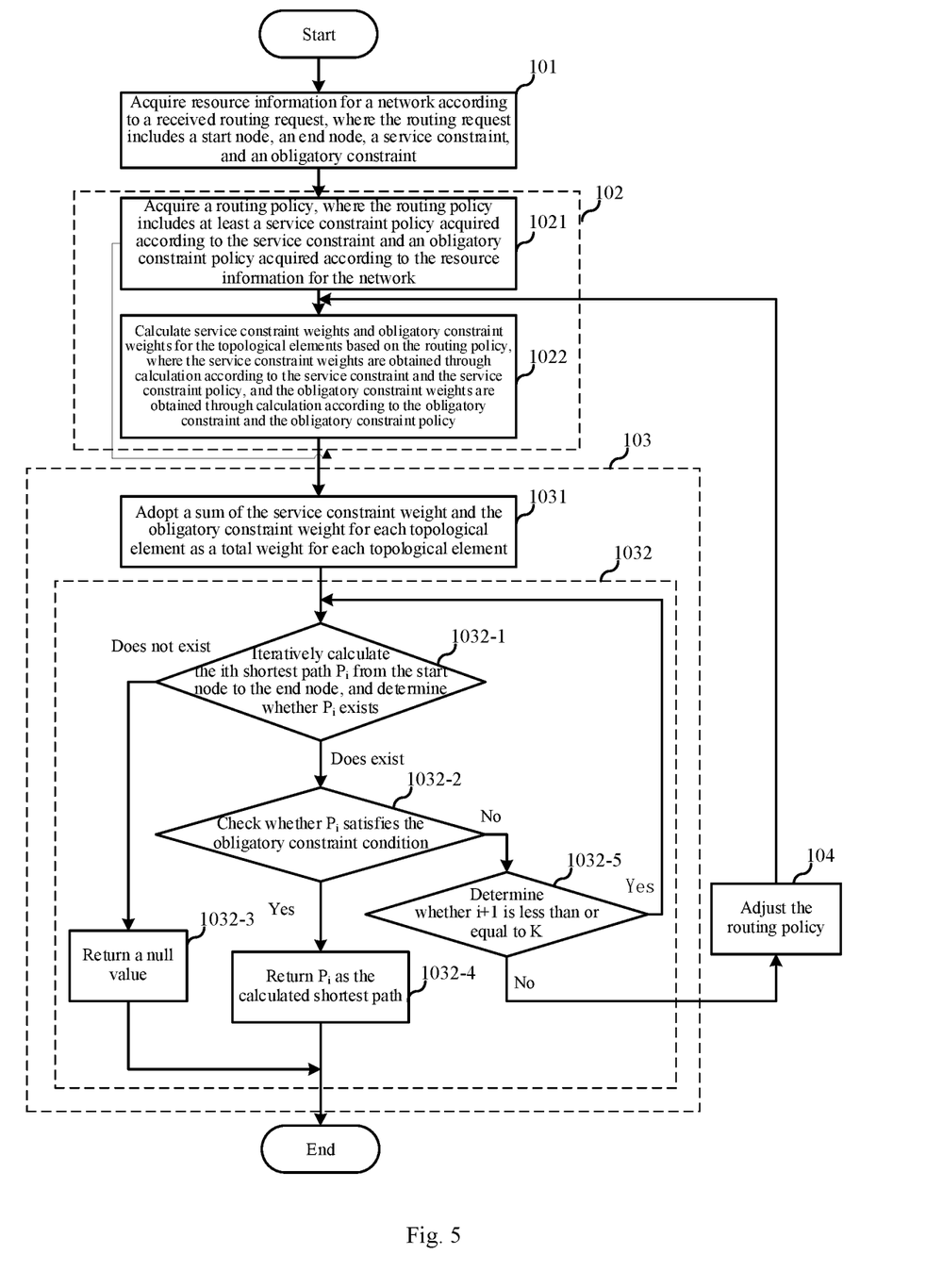
FIG. 5 is a flowchart of a method for calculating a shortest path according to an example embodiment two of the present disclosure.

A flowchart of the method for calculating a shortest path in the example embodiment two is shown in FIG. 5, where compared with FIG. 4 in the example embodiment one, step 104 is added to adjust the routing policy.

Specifically, when the determination result of sub-step 1032-5 is no, it means that the shortest path from the start node to the end node that satisfies the obligatory constraint cannot be found under the current routing policy. In this case, the process proceeds to step 104 to adjust the routing policy; and then returns to sub-step 1022, so that the service constraint weights and the obligatory constraint weights for the topological elements can be recalculated based on the adjusted routing policy; and a shortest path from the start node to the end node that satisfies the obligatory constraint can be calculated according to the recalculated service constraint weights and obligatory constraint weights for the topological elements. Here, if the shortest path satisfying the constraint condition cannot be obtained under the current routing policy, the routing policy may be adjusted and then recalculation is performed, until the shortest path satisfying the constraint condition is found.

In step 104, the routing policy is adjusted. Specifically, the obligatory constraint policy may be adjusted, such as adjusting $w_0$, $c_e$ (at least one of $c_n$, $c_\ell$) or $v_B^e(G)$ (at least one of $v_B''(G)$, $v_B^\ell(G)$) in Equation (3); or, the K value may be adjusted.

It should be noted that in this embodiment, after the total weight for each topological element is calculated, the calculation of the shortest path based on the K shortest path algorithm is illustrated as an example. In other examples, the shortest path may also be calculated based on another algorithm, and when the shortest path cannot be obtained, the routing policy may also be adjusted, and the total weight of each topological element may be recalculated based on the adjusted routing policy and the shortest path may be recalculated based on that another algorithm.

An example embodiment three of the present disclosure relates to a method for calculating a shortest path. The example embodiment three is substantially the same as the first or example embodiment two, with the main difference being that: in the example embodiment three of the present disclosure, an illustration of calculating the ratio evaluation coefficient $c_e$ is provided.

In this embodiment, the ratio evaluation coefficient $c_e$ may be determined from a statistical characteristic value $w_1$ of the service constraint weight for each topological element; and the statistical characteristic value $w_1$ is, for example, the variance.

Specifically, a preset relationship between the variance of the service constraint weights for the topological elements and the ratio evaluation coefficient is pre-stored within the routing acquisition device; and the variance of the service constraint weights for the topological elements may be calculated first, and then the ratio evaluation coefficient $c_e$ corresponding to that variance may be obtained based on the preset relationship between the variance and the ratio evaluation coefficients, where in this preset relationship, the larger the variance is, the smaller the ratio evaluation coefficient is; and the preset relationship may be expressed in the form of a control table, or in the form of a function.

In the calculation of the ratio evaluation coefficient $c_e$ $c_e$ is calculated based on the statistical characteristic value $w_1$ of the service constraint weights for the topological elements in the current network, which can make the obtained ratio evaluation coefficient $c_e$ better match the current network, thus making the calculated obligatory constraint weights more accurate, thereby helping to further improve the efficiency of routing calculation with obligatory constraints in large-scale complex networks.

The steps of the above methods are divided only for the sake of clear description, and during implementation, the steps may be combined into one step or one step may be split into multiple steps. All shall fall within the scope of protection of the present disclosure provided that the same logical relationship is included. Insignificant modifications added to or insignificant designs introduced into an algorithm or a procedure without changing the core of the algorithm or the procedure shall fall within the scope of protection of the present disclosure.

Figure 6:
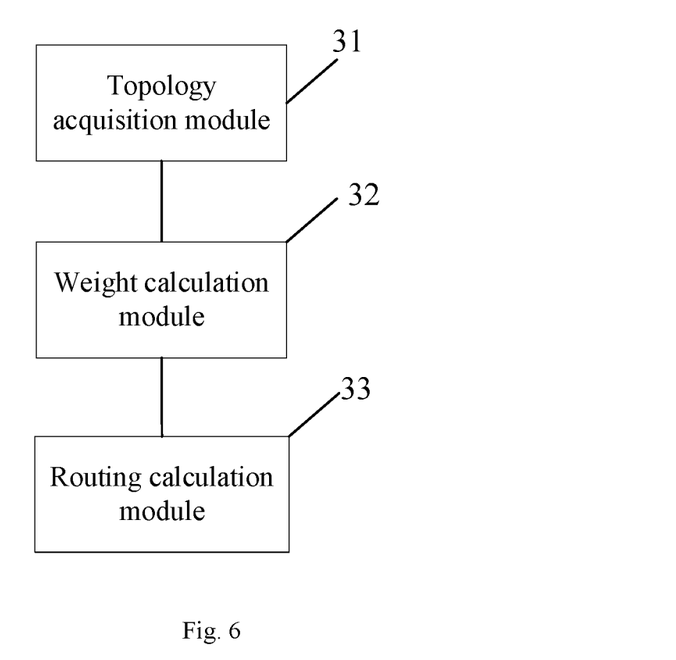
FIG. 6 is a block diagram of a routing acquisition device according to an example embodiment four of the present disclosure.

An example embodiment four of the present disclosure relates to a routing acquisition device, as shown in FIG. 6, including:

a topology acquisition module 31 configured to acquire resource information for a network according to a received routing request, where the routing request includes a start node, an end node, a service constraint, and an obligatory constraint;

a weight calculation module 32 configured to calculate service constraint weights for topological elements in the network according to the service constraint, and calculate obligatory constraint weights for the topological elements according to the obligatory constraint and the resource information for the network; and a routing calculation module 33 configured to calculate, according to the service constraint weights and the obligatory constraint weights for the topological elements, a shortest path from the start node to the end node that satisfies the obligatory constraint.

Not surprisingly, this implementation is a device embodiment corresponding to the first, or second, or third implementation, and this implementation may be implemented in conjunction with the first, or second, or third implementation. The relevant technical details mentioned in the first, or second, or third implementation are still valid in this implementation, and will not be repeated here in order to reduce repetition. Accordingly, the relevant technical details mentioned in this implementation may also be applied in the first, or second, or third implementation.

It is worth mentioning that all the modules involved in this embodiment are logic modules. In practical applications, a logic unit may be a physical unit or a part of a physical unit, or be implemented by a combination of multiple physical units. In addition, in order to highlight the innovative part of the present disclosure, units that are not closely related to solving the technical problem proposed by the present disclosure are not introduced in this embodiment, but this does not mean that there are no other units in this embodiment.

Figure 7:
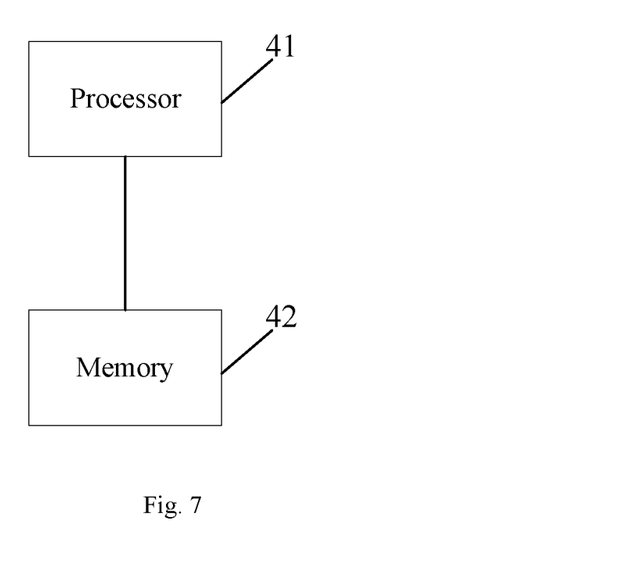
FIG. 7 is a block diagram of a server according to an example embodiment five of the present disclosure.

An example embodiment five of the present disclosure relates to a server, as shown in FIG. 7, including:

at least one processor 41; and a memory 42 communicatively connected to the at least one processor 41, where the memory 42 stores instructions executable by the at least one processor 41, the instructions being executed by the at least one processor 41 to enable the at least one processor 41 to perform the above method for calculating a shortest path.

Here, the memory 42 and the at least one processor 41 are connected by means of a bus, and the bus may include any number of bus interconnects and bridges, and the bus connects the at least one processor 41 and various circuits of the memory 42 together. The bus may also connect various other circuits such as a peripheral device, a voltage regulator and a power management circuit, which are well known in the art and therefore will not be further described here. A bus interface provides an interface between the bus and a transceiver. The transceiver may be one element or multiple elements, such as multiple receivers and transmitters, and provide a unit for communicating with various other apparatuses on a transmission medium. Data that has been processed by the processor 41 is transmitted on a wireless medium by means of an antenna. Further, the antenna also receives data and transmits the data to the processor 41.

The processor 41 is responsible for bus management and general processing, and may also provide various functions, including timing, peripheral interface, voltage regulation, power management and other control functions. The memory 42 may be configured to store data used by the processor 41 when performing operations.

The example embodiment six of the present disclosure relates to a non-transitory computer-readable storage medium storing a computer program. The computer program, when executed by the processor, causes the processor to perform the methods according to the embodiments above.

That is, those having ordinary skills in the art can understand that all or some of the steps in the methods for implementing the above embodiments can be completed by instructing related hardware through a program, which is stored in a storage medium and includes several instructions configured to enable a device (which may be a single-chip microcomputer, a chip, etc.) or a processor to execute all or some of the steps of the methods according to the embodiments of the present disclosure. The aforementioned storage medium includes: various media that can store program codes, such as a USB flash drive, a mobile hard disk, a read-only memory (ROM), a random access memory (RAM), a magnetic disk or an optical disk.

Those having ordinary skills in the art can understand that several embodiments are provided to explain various implementations of the present disclosure, but in practical applications, various changes in form and detail can be made therein without departing from the principle and scope of the present disclosure.

The invention claimed is:

1. A method for calculating a shortest path, comprising:
acquiring resource information for a network according to a received routing request, wherein the routing request comprises a start node, an end node, a service constraint, and an obligatory constraint, wherein the obligatory constraint comprises nodes and/or links which must be passed through from the start node to the end node;
calculating service constraint weights for topological elements in the network according to the service constraint, and calculating obligatory constraint weights for the topological elements according to the obligatory constraint and the resource information for the network; and
calculating, according to the service constraint weights and the obligatory constraint weights for the topological elements, a shortest path from the start node to the end node that satisfies the obligatory constraint;
wherein calculating service constraint weights for topological elements in the network according to the service constraint, and calculating obligatory constraint weights for the topological elements according to the obligatory constraint and the resource information for the network comprises:
acquiring a routing policy, wherein the routing policy comprises at least a service constraint policy acquired according to the service constraint and an obligatory constraint policy acquired according to the resource information for the network; and
calculating the service constraint weights and the obligatory constraint weights for the topological elements based on the routing policy, wherein the service constraint weights are obtained through calculation according to the service constraint and the service constraint policy, and the obligatory constraint weights are obtained through calculation according to the obligatory constraint and the obligatory constraint policy.

2. The method for calculating a shortest path of claim 1, wherein calculating, according to the service constraint weights and the obligatory constraint weights for the topological elements, a shortest path from the start node to the end node that satisfies the obligatory constraint comprising:
in response to the shortest path being unobtainable according to the service constraint weights and the obligatory constraint weights for the topological elements, adjusting the routing policy, recalculating the service constraint weights and the obligatory constraint weights for the topological elements based on the adjusted routing policy, and calculating the shortest path from the start node to the end node that satisfies the obligatory constraint according to the recalculated service constraint weights and obligatory constraint weights for the topological elements.

3. The method for calculating a shortest path of claim 1, wherein the obligatory constraint weight for each topological element comprises a total sum of obligatory constraint weights generated by obligatory elements in the obligatory constraint on the topological element; and an obligatory constraint weight generated by each obligatory element on the topological element is obtained based on the obligatory constraint policy.

4. The method for calculating a shortest path of claim 3, wherein the obligatory constraint policy is expressed with an equation:

$$f_C^E(e, g, G) = c_e w_0 v_g^e(G) / v_B^e(G)$$

where $f_C^E$ denotes the obligatory constraint policy, e denotes the obligatory element, g denotes the topological element, and G denotes a set of the topological elements;
$w_0$ denotes a statistical characteristic value of service constraint weights of at least part of the topological elements, and
$c_e$ denotes a ratio evaluation coefficient of service constraint weights and obligatory constraint weights for the obligatory elements, and $c_e$ is a real number greater than 0; and
$v_g^e(G)$ denotes a proximity evaluation coefficient for the obligatory elements with respect to the topological elements, and
$v_B^e(G)$ denotes a baseline value of a proximity evaluation coefficient for the obligatory elements with respect to at least part of the topological elements.

5. The method for calculating a shortest path of claim 4, wherein the at least part of the topological elements comprises: a topological element in the set of the topological elements directly connected to the obligatory elements.

6. The method for calculating a shortest path of claim 4, wherein the statistical characteristic value $w_0$ is one of a minimum value, a maximum value, an average value, and a median value of the service constraint weights for the topological elements.

7. The method for calculating a shortest path of claim 4, wherein the ratio evaluation coefficient $c_e$ is calculated by:
calculating a statistical characteristic value $w_1$ of the service constraint weights for the topological elements; and
acquiring a ratio evaluation coefficient $c_e$ corresponding to the statistical characteristic value $w_1$ according to a preset relationship between statistical characteristic values and ratio evaluation coefficients.

8. The method for calculating a shortest path of claim 7, wherein the statistical characteristic value $w_1$ is a variance of the service constraint weights for the topological elements;

and in the preset relationship, the larger the variance is, the smaller the ratio evaluation coefficient is.

9. The method for calculating a shortest path of claim 1, wherein the topological elements comprise links and nodes.

10. The method for calculating a shortest path of claim 1, wherein calculating, according to the service constraint weights and the obligatory constraint weights for the topological elements, a shortest path from the start node to the end node that-passes satisfies the obligatory constraint comprises:
   adopting a sum of the service constraint weight and the obligatory constraint weight for each topological element as a total weight for each topological element; and
   calculating, according to the total weights for the topological elements, a shortest path from the start node to the end node that passes through the obligatory constraint.

11. The method for calculating a shortest path of claim 10, wherein said calculating, according to the total weights for the topological elements, a shortest path from the start node to the end node that passes through the obligatory constraint is implemented based on a K shortest path algorithm.

12. A non-transitory computer-readable storage medium storing a computer program which, when executed by a processor, causes the processor to perform the method for calculating a shortest path of claim 1.

13. A routing acquisition device, comprising:
   a topology acquisition module configured to acquire resource information for a network according to a received routing request, wherein the routing request comprises a start node, an end node, a service constraint, and an obligatory constraint, wherein the obligatory constraint comprises nodes and/or links which must be passed through from the start node to the end node;
   a weight calculation module configured to calculate service constraint weights for topological elements in the network according to the service constraint, and calculate obligatory constraint weights for the topological elements according to the obligatory constraint and the resource information for the network; and
   a routing calculation module configured to calculate, according to the service constraint weights and the obligatory constraint weights for the topological elements, a shortest path from the start node to the end node that satisfies the obligatory constraint;
   wherein the weight calculation module is further configured to:
   acquire a routing policy, wherein the routing policy comprises at least a service constraint policy acquired according to the service constraint and an obligatory constraint policy acquired according to the resource information for the network; and
   calculate the service constraint weights and the obligatory constraint weights for the topological elements based on the routing policy, wherein the service constraint weights are obtained through calculation according to the service constraint and the service constraint policy, and the obligatory constraint weights are obtained through calculation according to the obligatory constraint and the obligatory constraint policy.

14. A server, comprising:
   at least one processor; and
   a memory communicatively connected to the at least one processor, wherein the memory stores instructions executable by the at least one processor, the instructions being executed by the at least one processor to enable the at least one processor to perform a method for calculating a shortest path, comprising:
   acquiring resource information for a network according to a received routing request, wherein the routing request comprises a start node, an end node, a service constraint, and an obligatory constraint, wherein the obligatory constraint comprises nodes and/or links which must be passed through from the start node to the end node;
   calculating service constraint weights for topological elements in the network according to the service constraint, and calculating obligatory constraint weights for the topological elements according to the obligatory constraint and the resource information for the network; and
   calculating, according to the service constraint weights and the obligatory constraint weights for the topological elements, a shortest path from the start node to the end node that satisfies the obligatory constraint;
   wherein calculating service constraint weights for topological elements in the network according to the service constraint, and calculating obligatory constraint weights for the topological elements according to the obligatory constraint and the resource information for the network comprises:
   acquiring a routing policy, wherein the routing policy comprises at least a service constraint policy acquired according to the service constraint and an obligatory constraint policy acquired according to the resource information for the network; and
   calculating the service constraint weights and the obligatory constraint weights for the topological elements based on the routing policy, wherein the service constraint weights are obtained through calculation according to the service constraint and the service constraint policy, and the obligatory constraint weights are obtained through calculation according to the obligatory constraint and the obligatory constraint policy.

* * * * *